United States Patent
Baba et al.

(10) Patent No.: US 9,411,325 B2
(45) Date of Patent: Aug. 9, 2016

(54) EXCAVATION CONTROL SYSTEM FOR HYDRAULIC EXCAVATOR

(71) Applicant: KOMATSU LTD., Tokyo (JP)

(72) Inventors: Akinori Baba, Hiratsuka (JP); Tetsuya Nakayama, Chigasaki (JP); Masashi Ichihara, Hiratsuka (JP)

(73) Assignee: KOMATSU LTD., Tokyo (JP)

( * ) Notice: Subject to any disclaimer, the term of this patent is extended or adjusted under 35 U.S.C. 154(b) by 319 days.

(21) Appl. No.: 14/355,932

(22) PCT Filed: Oct. 18, 2013

(86) PCT No.: PCT/JP2013/078341
§ 371 (c)(1),
(2) Date: May 2, 2014

(87) PCT Pub. No.: WO2014/061790
PCT Pub. Date: Apr. 24, 2014

(65) Prior Publication Data
US 2014/0297040 A1    Oct. 2, 2014

(30) Foreign Application Priority Data
Oct. 19, 2012  (JP) ................. 2012-231390

(51) Int. Cl.
*G06F 19/00* (2011.01)
*G05B 13/02* (2006.01)
*E02F 9/20* (2006.01)

(52) U.S. Cl.
CPC ........... *G05B 13/026* (2013.01); *E02F 9/2037* (2013.01)

(58) Field of Classification Search
CPC .............................. G05B 13/026; E02F 9/2037
See application file for complete search history.

(56) References Cited

U.S. PATENT DOCUMENTS

| 5,953,838 A | 9/1999 | Steenwyk |
| 6,778,097 B1 * | 8/2004 | Kajita ................ E02F 3/437 340/12.5 |

(Continued)

FOREIGN PATENT DOCUMENTS

| JP | 11-107326 A | 4/1999 |
| JP | 2006-265954 A | 10/2006 |

(Continued)

OTHER PUBLICATIONS

Jun, Yan, et al. "Automatization of excavator and study of its autocontrol." Measuring Technology and Mechatronics Automation (ICMTMA), 2011 Third International Conference on. vol. 1. IEEE, 2011.*

(Continued)

*Primary Examiner* — Michael D Masinick
(74) *Attorney, Agent, or Firm* — Global IP Counselors, LLP

(57) ABSTRACT

An excavation control system includes a global coordinate computing device, a prediction correcting part, a cutting edge position data generating part, and a designed terrain data generating part. The global coordinate computing device generates revolving unit orientation data (Q) that indicates an orientation of a revolving unit. The prediction correcting part generates corrected revolving unit orientation data (R) by predictively correcting the revolving unit orientation data (Q) based on a delay time (t) and revolve angle speed data (Dω) that indicates a revolve angle speed (ω) of the revolving unit. The cutting edge position data generating part generates cutting edge position data (S) that indicates a position of a cutting edge based on reference position data (P1), the revolving unit orientation data (Q), and the corrected revolving unit orientation data (R). The designed terrain data generating part generates designed terrain data (U) based on the cutting edge position data (S) and stereoscopic designed terrain data (T).

9 Claims, 9 Drawing Sheets

(56) References Cited

U.S. PATENT DOCUMENTS

| | | | | |
|---|---|---|---|---|
| 2005/0000703 | A1* | 1/2005 | Furuno | G01G 19/08 |
| | | | | 172/2 |
| 2013/0158785 | A1 | 6/2013 | Fukano et al. | |
| 2013/0158787 | A1 | 6/2013 | Nomura et al. | |
| 2013/0302124 | A1* | 11/2013 | Matsuyama | E02F 3/435 |
| | | | | 414/687 |
| 2013/0315699 | A1* | 11/2013 | Matsuyama | E02F 3/435 |
| | | | | 414/687 |
| 2014/0142817 | A1* | 5/2014 | Matsuyama | E02F 3/437 |
| | | | | 701/50 |
| 2014/0200776 | A1* | 7/2014 | Matsuyama | E02F 3/435 |
| | | | | 701/50 |
| 2014/0297040 | A1* | 10/2014 | Baba | G05B 13/026 |
| | | | | 700/275 |
| 2015/0149047 | A1* | 5/2015 | Kubota | E02F 9/2054 |
| | | | | 701/50 |
| 2015/0159348 | A1* | 6/2015 | Takaura | E02F 9/2004 |
| | | | | 701/50 |
| 2015/0233086 | A1* | 8/2015 | Takaura | E02F 3/435 |
| | | | | 414/685 |
| 2015/0240446 | A1* | 8/2015 | Takaura | E02F 9/2228 |
| | | | | 414/685 |
| 2015/0276416 | A1* | 10/2015 | Yamasaki | H04W 4/046 |
| | | | | 701/537 |
| 2016/0040390 | A1* | 2/2016 | Ozaki | E02F 9/086 |
| | | | | 180/309 |

FOREIGN PATENT DOCUMENTS

| | | |
|---|---|---|
| JP | 2010-248703 A | 11/2010 |
| WO | 95/30059 A1 | 11/1995 |
| WO | 2012/114869 A1 | 8/2012 |
| WO | 2012/114871 A1 | 8/2012 |

OTHER PUBLICATIONS

Shao, Hui, et al. "Automatic excavation planning of hydraulic excavator." Intelligent Robotics and Applications. Springer Berlin Heidelberg, 2008. 1201-1211.*

Yamamoto, Hiroshi, et al. "Basic technology toward autonomous hydraulic excavator." 26th International Symposium on Automation and Robotics in Construction (ISARC 2009). 2009.*

Yamamoto, Hiroshi, et al. "Development of the autonomous hydraulic excavator prototype using 3-D information for motion planning and control." System Integration (SII), 2010 IEEE/SICE International Symposium on. IEEE, 2010.*

Jun, Zhang, et al. "Design of electronic control system of hydraulic excavator with CAN bus and PID method." Intelligent System Design and Engineering Application (ISDEA), 2010 International Conference on. vol. 1. IEEE, 2010.*

The International Search Report for the corresponding international application No. PCT/JP2013/078341, issued on Jan. 21, 2014.

* cited by examiner

EXCAVATION CONTROL SYSTEM FOR HYDRAULIC EXCAVATOR

CROSS-REFERENCE TO RELATED APPLICATIONS

This application is a U.S. National stage application of International Application No. PCT/JP2013/078341, filed on Oct. 18, 2013. This U.S. National stage application claims priority under 35 U.S.C. §119(a) to Japanese Patent Application No. 2012-231390, filed in Japan on Oct. 19, 2012, the entire contents of which are hereby incorporated herein by reference.

BACKGROUND

1. Field of the Invention

The present invention relates to an excavation control system for a hydraulic excavator.

2. Background Information

An area-limiting excavation control has been conventionally proposed that causes a bucket of a working unit to move along a designed terrain that indicates a target shape of an excavation object in a construction machine that includes a drive unit, a revolving unit provided in a revolvable manner on the drive unit, and the working unit provided on the superstructure (see, for example, International Publication No. WO 95/30059).

Further, a method is known for determining a designed terrain based on a target work surface calculated from electronic data of a plan, and from a position of a bucket calculated from position information received from a GS antenna device (see, for example, Japanese Patent Laid-open No. 2006-265954).

SUMMARY

However, because a delay time is present due to processing that is conducted from the reception of the position information by the GPS antenna device until the determination of the designed terrain when performing excavating work while obtaining the designed terrain in the method described in Japanese Patent Laid-open No. 2006-265954, the excavating is conducted while obtaining the designed terrain before the delay time has elapsed. Therefore, the designed terrain corresponding to the position of the working unit before moving may be obtained if, for example, the revolving unit has revolved or the vehicle main body has swayed up or down.

The present invention takes into account the above conditions and thus an object of the present invention is to provide an excavation control system for a hydraulic excavator, the system being capable of obtaining a designed terrain that corresponds to the current position of a working unit.

An excavation control system according to a first exemplary embodiment of the present invention is provided for a hydraulic excavator that has a drive unit, a revolving unit revolvable about a revolving axis on the drive unit, and a working unit attached to the revolving unit. The excavation control system according to the first exemplary embodiment is provided with a first data generating part, a prediction correcting part, a second data generating part, a third data generating part, and an excavation limit control part. The first data generating part is configured to generate revolving unit disposition data indicating a disposition of the revolving unit. The prediction correcting part is configured to generate corrected revolving unit disposition data by predictively correcting the revolving unit disposition data based on motion data indicating a motion of the revolving unit. The second data generating part is configured to generate working unit position data indicating a position of the working unit based on the revolving unit disposition data and the corrected revolving unit disposition data. The third data generating part is configured to generate designed terrain data indicating a target shape of an excavation object based on the working unit position data. The excavation limit control part is configured to limit a speed of the working unit with respect to the designed terrain in accordance with a distance from the designed terrain obtained based on the working unit position data and the designed terrain data. The prediction correcting part is configured to generate the corrected revolving unit disposition data by predictively correcting the revolving unit disposition data based on the motion data and a delay time including a time period required for the second data generating part to generate the working unit position data and a time period required for the third data generating part to generate the designed terrain data.

Based on the excavation control system according to the first exemplary embodiment of the present invention, the prediction correcting part can predict a disposition position of the revolving unit at the point in time of generating the designed terrain data based on the motion of the revolving unit. As a result, the second data generating part can predict the position of the working unit at the point in time that the delay time has elapsed. Consequently, the third data generating part can obtain the designed terrain that corresponds to the position of the working unit at the point in time that the designed terrain data is generated.

The excavation control system according to a second exemplary embodiment of the present invention is related to the first exemplary embodiment, wherein the prediction correcting part is configured to obtain revolve angle speed data at a first frequency, the revolve angle speed data indicating a revolve angle speed of the revolving unit about the revolving axis, and to predictively correct the revolving unit disposition data based on a multiplied value of the delay time and the revolve angle speed indicated by the revolve angle speed data.

The excavation control system according to a third exemplary embodiment of the present invention is related to the second exemplary embodiment, wherein the first data generating part is configured to obtain a plurality of reference position data at a second frequency, the plurality of reference position data indicating positions of a plurality of reference parts disposed on the revolving unit, and to generate revolving unit orientation data based on the plurality of reference position data. The revolving unit orientation data indicates an orientation of the revolving unit. The prediction correcting part is configured to obtain the revolving unit orientation data at least once.

The excavation control system according to a fourth exemplary embodiment of the present invention is related to the third exemplary embodiment, wherein the first frequency is shorter than the second frequency, and the prediction correcting part is configured to obtain the revolving unit orientation data at the second frequency.

Based on the excavation control system according to the fourth exemplary embodiment of the present invention, the prediction correcting part is able to use the revolving unit disposition data obtained cyclically to generate the corrected revolving unit disposition data. Therefore, even when thermal drift occurs in an apparatus that generates the motion data of the revolving unit, the disposition of the revolving unit may be ascertained based on the revolving unit disposition data that is updated every second frequency. Therefore, the generation of the corrected revolving unit disposition data that indicates the disposition of the revolving unit may be conducted continuously.

The excavation control system according to a fifth exemplary embodiment of the present invention is related to any of the first to fourth exemplary embodiments, wherein the second data generating part is configured to generate revolving center position data based on the revolving unit disposition data, the revolving center position data indicating a position of a revolving center of the hydraulic excavator, the revolving center passing through the revolving axis, and to generate the working unit position data based on the revolving center position data and the corrected revolving unit orientation data.

The excavation control system according to a sixth exemplary embodiment of the present invention is related to any of the first to fifth exemplary embodiments, wherein the prediction correcting part is configured to calculate a predicted tilt angle by predictively correcting a tilt angle, the tilt angle indicating tilt angle of the revolving unit in a front-back direction and in a left-right direction, and the second data generating part is configured to generate the working unit position data based on the predicted tilt angle, the revolving unit disposition data, and the corrected revolving unit orientation data.

Based on the excavation control system according to the sixth exemplary embodiment of the present invention, a pitch angle and a roll angle of the revolving unit may be predicted at the point in time that the designed terrain data is generated even when the hydraulic excavator is working while revolving on a slope. Therefore, the designed terrain that corresponds to the current position of the working unit can be obtained.

According to exemplary embodiments of the present invention, an excavation control system for a hydraulic excavator can be provided that can obtain a designed terrain to be excavated that corresponds to a current position of a working unit.

DESCRIPTION OF EMBODIMENTS

Configuration of Hydraulic Excavator 100

Figure 1:
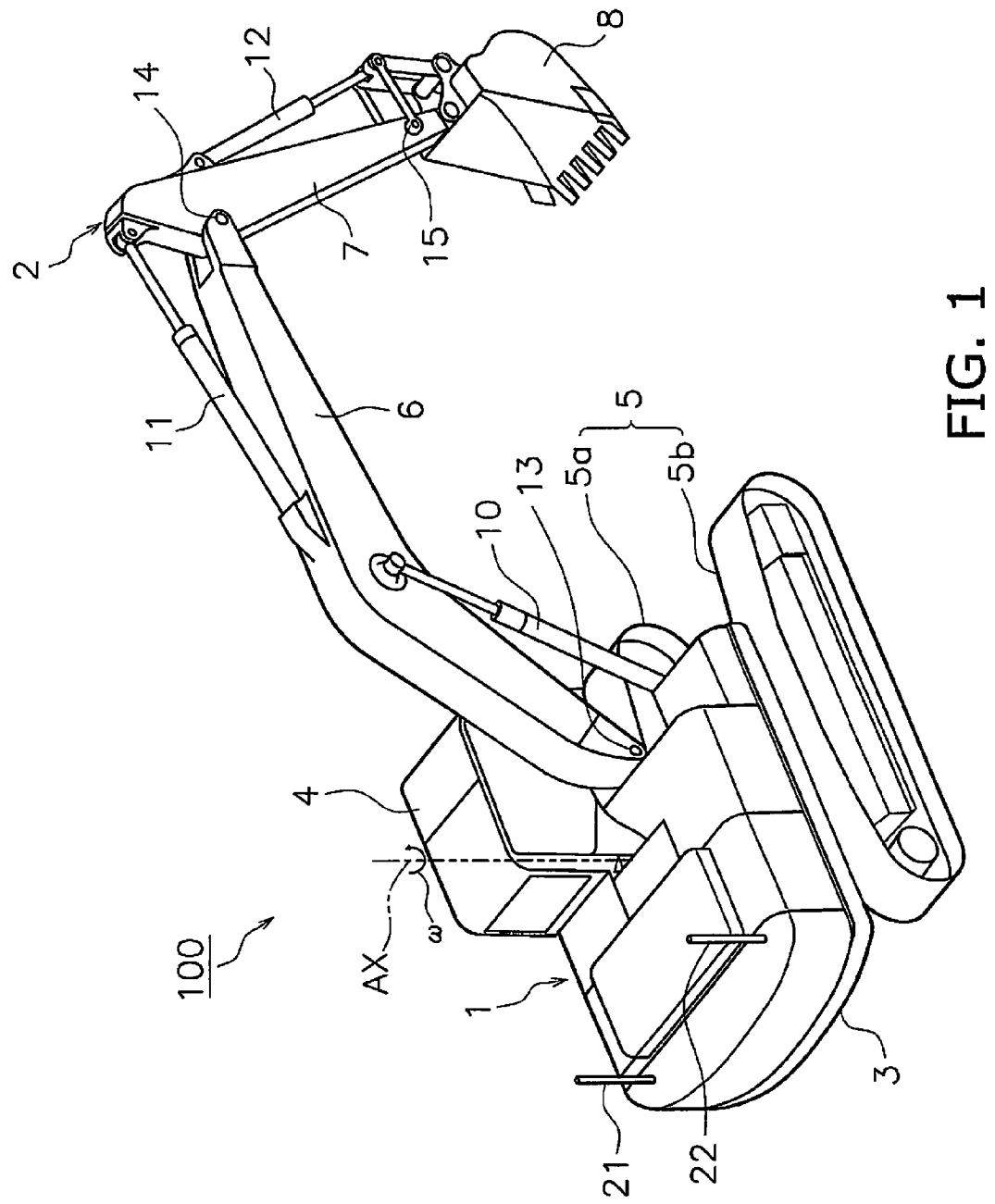
FIG. 1 is a perspective view of a hydraulic excavator.

FIG. 1 is a perspective view of a hydraulic excavator 100 according to an exemplary embodiment. The hydraulic excavator 100 has a vehicle main body 1 and a working unit 2. Moreover, an excavation control system 200 (see FIG. 3) is mounted in the hydraulic excavator 100. The operations and configuration of the excavation control system 200 is described below.

The vehicle main body 1 has a revolving unit 3, a cab 4, and a drive unit 5. The revolving unit 3 is disposed on the drive unit 5. The revolving unit 3 can revolve relative to a revolving axis AX that extends in the vertical direction. The revolving unit 3 contains devices, such as an engine and a hydraulic pump, which are not illustrated. A counterweight is disposed at a rear end part of the revolving unit 3, and a first GNSS antenna 21 and a second GNSS antenna 22 (example of a plurality of reference parts) are disposed on the counterweight. The first GNSS antenna 21 and the second GNSS antenna 22 use a real-time kinematic-global navigation satellite system (RTK-GNSS). The cab 4 is provided on the revolving unit 3 and is disposed on the front part of the revolving unit 3. A driver's seat and various operating devices are provided inside the cab 4. The drive unit 5 has a pair of crawler belts 5a and 5b, and the hydraulic excavator 100 travels due to the revolution of the pair of crawler belts 5a and 5b. Unless otherwise specified in the present exemplary embodiment, the directions of forward, rearward, left and right are described in relation to the driver's seat. The direction in which the driver's seat faces forward represents the forward direction, and the direction opposite to the forward direction represents the rearward direction. The right and left in the lateral direction when the driver's seat is facing the front respectively represent the right direction and the left direction.

The working unit 2 is attached to the revolving unit 3 in a manner that allows vertical swinging. The working unit 2 includes a boom 6, an arm 7, a bucket 8, a boom cylinder 10, and arm cylinder 11, and a bucket cylinder 12. The proximal end part of the boom 6 is attached in a swingable manner to the revolving unit 3 via a boom pin 13. The proximal end part of the arm 7 is attached in a swingable manner to the distal end part of the boom 6 via an arm pin 14. The bucket 8 is attached in a swingable manner to the distal end part of the arm 7 via a bucket pin 15. The boom cylinder 10, the arm cylinder 11, and the bucket cylinder 12 are hydraulic cylinders that are driven by hydraulic fluid. The boom cylinder 10 drives the boom 6. The arm cylinder 11 drives the arm 7. The bucket cylinder 12 drives the bucket 8.

Figure 2A:
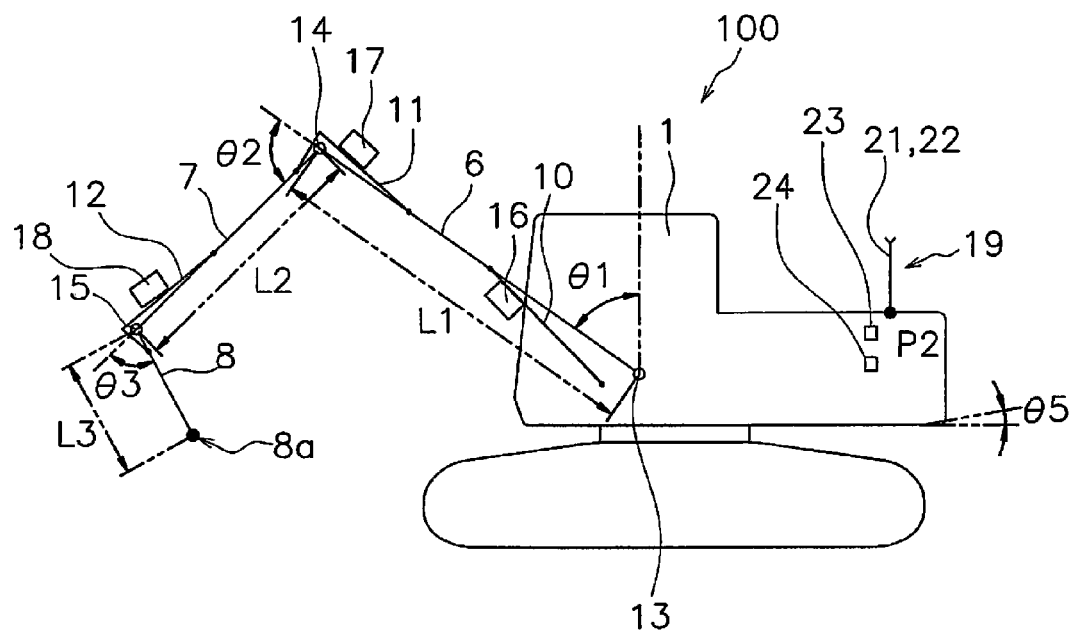
FIG. 2A is a schematic side view of a configuration of the hydraulic excavator.
Figure 2B:
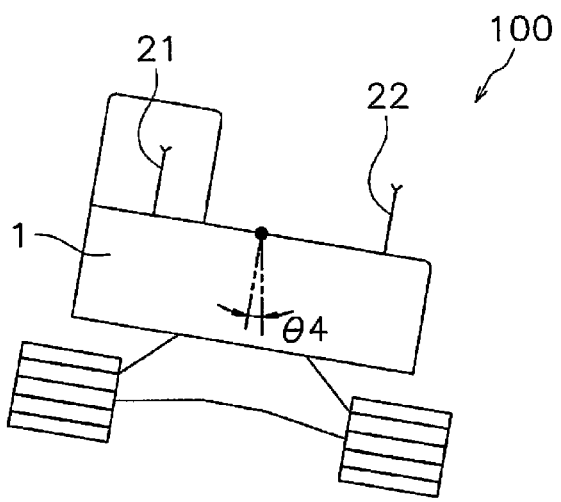
FIG. 2B is a schematic rear view of a configuration of the hydraulic excavator.

FIG. 2A is a side view of the hydraulic excavator 100 and FIG. 2B is a rear view of the hydraulic excavator 100. As illustrated in FIG. 2A, the length of the boom 6, that is the length from the boom pin 13 to the arm pin 14, is indicated as L1. The length of the arm 7, that is the length from the arm pin 14 to the bucket pin 15, is indicated as L2. The length of the bucket 8, that is the length from bucket pin 15 to the distal end (hereinbelow referred to as "cutting edge 8a") of a tooth of the bucket 8, is indicated as L3.

As illustrated in FIG. 2A, first to third stroke sensors 16 to 18 are respectively provided on the boom cylinder 10, the arm cylinder 11, and the bucket cylinder 12. The first stroke sensor 16 detects a stroke length of the boom cylinder 10 (hereinbelow referred to as "boom cylinder length L1"). An after-mentioned display controller 28 (FIG. 3) calculates a tilt angle θ1 of the boom 6 relative to the perpendicular direction of the vehicle main body 1 from the boom cylinder length L1 detected by the first stroke sensor 16. The second stroke sensor 17 detects a stroke length of the arm cylinder 11 (hereinbelow referred to as "arm cylinder length L2"). The display controller 28 calculates a tilt angle θ2 of the arm 7 relative to the boom 6 from the arm cylinder length L2 detected by the second stroke sensor 17. The third stroke sensor 18 detects a stroke length of the bucket cylinder 12 (hereinbelow referred to as "bucket cylinder length L3"). The display controller 28 calculates a tilt angle θ3 of the cutting edge 8a on the bucket 8 relative to the arm 7 from the bucket cylinder length L3 detected by the third stroke sensor 18. In addition to measurements by a stroke sensor, the respective tilt angles θ1 to θ3 of the boom 6, the arm 7, and the bucket 8 may be obtained by a tilt angle sensor that measures the tilt angle of the boom 6 and that is attached to the boom 6, by a tilt angle sensor that measures the tilt angle of the arm 7 and that is attached to the arm 7, and a tilt angle sensor that measures the tilt angle of the bucket 8 and that is attached to the bucket 8.

As illustrated in FIG. 2A, a position detecting part 19 is provided on the vehicle main body 1. The position detecting part 19 detects a current position of the hydraulic excavator 100. The position detecting part 19 includes the abovementioned first and second GNSS antennas 21 and 22, a global coordinate computing device 23, and an inertial measurement unit (IMU) 24.

The first and second GNSS antennas 21 and 22 are disposed away from each other in the vehicle width direction on the revolving unit 3. The first GNSS antenna 21 receives reference position data P1 that indicates its own position from a positioning satellite. The second GNSS antenna 22 receives reference position data P2 that indicates its own position from a positioning satellite. The first GNSS antenna 21 and the second GNSS antenna 22 receive the reference position data P1 and P2 at, for example, a frequency of 10 Hz (example of the second frequency). The first GNSS antenna 21 and the second GNSS antenna 22 output the reference position data P1 and P2 to the global coordinate computing device 23 upon receiving the reference position data P1 and P2.

The global coordinate computing device 23 obtains both the reference position data P1 and P2 (example of the plurality of reference position data) that are represented by global coordinates from the first and second GNSS antennas 21 and 22. The global coordinate computing device 23 generates "revolving unit disposition data" that indicates the disposition of the revolving unit 3 based on both of the reference position data P1 and P2. In the present exemplary embodiment, the "revolving unit disposition data" includes reference position data P that represents either one of the reference position data P1 and P2, and revolving unit orientation data Q that is generated based on both of the reference position data P1 and P2. The revolving unit orientation data Q is determined based on an angle formed between a global coordinate reference orientation (e.g., north) and a straight line determined according to the reference position data P obtained by the first GNSS antenna 21 and the second GNSS antenna 22. The revolving unit orientation data Q indicates the orientation of the revolving unit 3 (that is, the working unit 2). The global coordinate computing device 23 updates the revolving unit disposition data (the reference position data P and the revolving unit orientation data Q) upon obtaining the reference position data P1 and P2 from the first GNSS antenna 21 and the second GNSS antenna 22 at, for example, a frequency of 10 Hz.

The IMU 24 is attached to the revolving unit 3 and detects "motion data" that indicates the motion of the revolving unit 3. In the present exemplary embodiment, the "motion data" is represented by revolve angle speed data Dω that indicates a revolve angle speed ω (see FIG. 1) when the revolving unit 3 revolves around the revolving axis AX. The IMU 24 also detects a tilt angle θ4 (see FIG. 2B) in the left-right direction of the vehicle main body 1, and a tilt angle θ5 (see FIG. 2A) in the front-back direction of the vehicle main body 1. The IMU 24 updates the revolve angle speed data Dω, the tilt angle θ4, and the tilt angle θ5 at, for example, a frequency of 100 Hz (example of the first frequency). The updating frequency of the IMU 24 is preferably shorter than the updating frequency of the global coordinate computing device 23.

The IMU 24 may be subject to a phenomenon called "thermal drift," which is a deviation of a point in which a measured value of a pitching angle and the like becomes zero due to a temperature deviation in a sensor. In this case, there is a concern that an inaccurate revolve angle speed ω may be detected by the IMU 24. Accordingly, the revolving unit orientation data Q generated cyclically by the global coordinate computing device 23 is used in the present exemplary embodiment for predictive correction as described below.

Configuration of Excavation Control System 200

Figure 3:
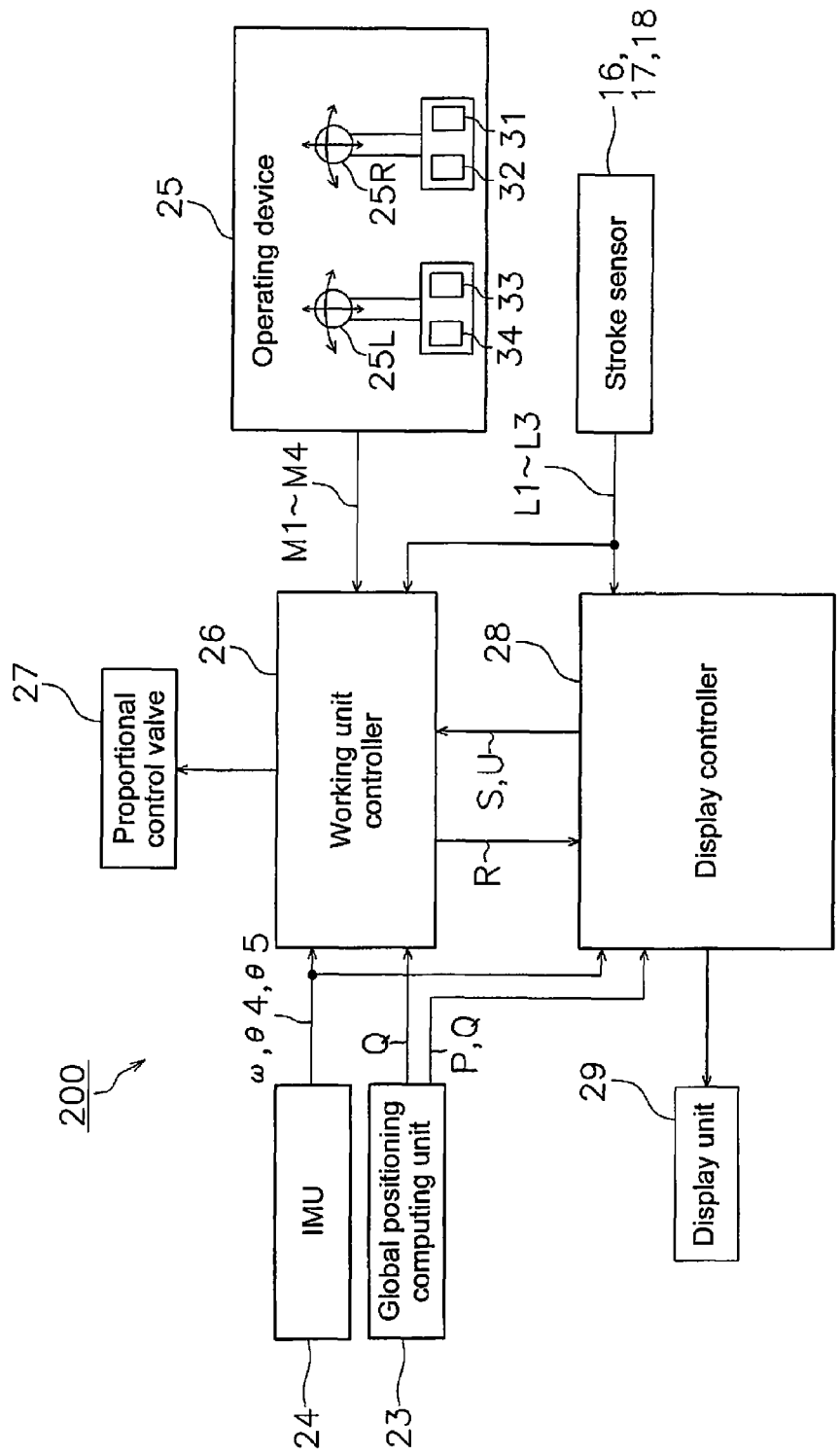
FIG. 3 is a block diagram of a configuration of an excavation control system.

FIG. 3 is a block diagram illustrating the configuration of the excavation control system 200. The excavation control system 200 is provided with an operating device 25, a working unit controller 26, a proportional control valve 27, the display controller 28, and a display unit 29.

The operating device 25 receives operator operations for driving the working unit 2 and outputs operation signals in response to the operator operations. Specifically, the operating device 25 has a left operating lever 25L that is disposed to the left of the operator, and a right operating lever 25R that is disposed to the right of the operator. The forward, rearward, left, and right operations of the left operating lever 25L and the right operating lever 25R correspond to motions in two axes. For example, a front-back direction operation of the right operating lever 25R corresponds to an operation of the boom 6, and up and down motions of the boom 6 are executed in response to the front-back direction operations. A left-right direction operation of the right operating lever 25R corresponds to an operation of the bucket 8, and excavating and releasing motions of the bucket 8 are executed in response to the left-right direction operations. A front-back direction operation of the left operating lever 25L corresponds to a revolution of the revolving unit 3, and left revolution motions and right revolution motions of the revolving unit 3 are executed in response to the front-back direction operations. A left-right direction operation of the left operating lever 25L corresponds to an operation of the arm 7, and extending and bending motions of the arm 7 are executed in response to the left-right direction operations.

The operating device 25 has a boom operation detecting part 31 and a bucket operation detecting part 32. The boom operation detecting part 31 uses a potentiometer or a Hall IC to detect an operation amount corresponding to a lever tilt angle. The boom operation detecting part 31 detects an operation of the boom 6 by the operator in accordance with an operation of the right operating lever 25R in the front-back direction. The boom operation detecting part 31 outputs a boom operation signal M1 in response to an operation of the right operating lever 25R in the front-back direction. The bucket operation detecting part 32 uses a potentiometer or a Hall IC to detect an operation amount corresponding to a lever tilt angle. The bucket operation detecting part 32 detects an operation of the bucket 8 by the operator in accordance with an operation of the right operating lever 25R in the left-right direction. The bucket operation detecting part 32 outputs a bucket operation signal M2 in response to an operation of the right operating lever 25R in the left-right direction.

The operating device 25 has an arm operation detecting part 33 and a revolution operation detecting part 34. The arm operation detecting part 33 uses a potentiometer or a Hall IC to detect an operation amount corresponding to a lever tilt angle. The arm operation detecting part 33 detects an operation of the arm 7 by the operator in response to an operation of the left operating lever 25L in the left-right direction. The arm operation detecting part 33 outputs an arm operation signal M3 in response to an operation of the left operating lever 25L in the left-right direction. The revolution operation detecting part 34 uses a potentiometer or a Hall IC to detect an operation amount corresponding to a lever tilt angle. The revolution operation detecting part 34 detects a revolution operation of the revolving unit 3 by the operator in accordance with an operation of the left operating lever 25L in the front-back direction. The revolution operation detecting part 34 outputs a revolution operation signal M4 in response to an operation of the left operating lever 25L in the front-back direction.

The detection of the operation amounts may use a system for detecting based on pilot pressures if the left operating lever 25L and the right operating lever 25R are used in a hydraulic driving system. Moreover, the revolution operation detecting part 34 and the arm operation detecting part 33 may be switched. At this time, the extending and bending motions of the arm 7 may be executed in accordance with operations of the left operating lever 25L in the front-back direction, and the left and right revolution motions of the revolving unit 3 may be executed in accordance with operations of the left operating lever 25L in the left-right direction.

The working unit controller 26 obtains, from the IMU 24, the revolve angle speed data Dω that indicates the revolve angle speed ω (see FIG. 1) of the revolution of the revolving unit 3 around the revolving axis AX. The working unit controller 26 obtains, from the global coordinate computing device 23, the revolving unit orientation data Q (example of the revolving unit disposition data). The working unit controller 26 generates corrected revolving unit orientation data R (example of corrected revolving unit disposition data) by predictively correcting the revolving unit orientation data Q based on the revolve angle speed data Dω, and transmits the corrected revolving unit orientation data R to the display controller 28. The predictive correcting performed by the working unit controller 26 is described below.

The controller 26 obtains the boom operation signal M1, the arm operation signal M2, the bucket operation signal M3, and the revolution operation signal M4 from the operating device 25. The working unit controller 26 obtains the respective boom cylinder length L1, the arm cylinder length L2, and the bucket cylinder length L3 (hereinbelow referred to as appropriate as "cylinder lengths L") from the first to third stroke sensors 16 to 18. The working unit controller 26 obtains after-mentioned designed terrain data U from the display controller 28. The working unit controller 26 obtains a position of a cutting edge 8a corresponding to the designed terrain based on the designed terrain data U and the cylinder lengths L. The working unit controller 26 generates a control signal N by using the distance between the designed terrain and the cutting edge 8a and the speed of the cutting edge 8a to adjust the operation signals M1 to M3 inputted by the operating device 25 as the cutting edge 8a moves along the designed terrain. The working unit controller 26 then outputs the control signal N (FIG. 4) to the proportional control valve 27. As a result, the speed as the working unit 2 approaches the designed terrain is limited in response to the distance to the designed terrain.

The proportional control valve 27 is disposed between the hydraulic pump, which is not illustrated, and the boom cylinder 10, the arm cylinder 11, and the bucket cylinder 12. The proportional control valve 27 supplies hydraulic fluid to the boom cylinder 10, the arm cylinder 11, and the bucket cylinder 12 while adjusting a valve opening degree for determining a supply amount of the hydraulic fluid for the boom cylinder 10, the arm cylinder 11, and the bucket cylinder 12, in response to the control signal N from the working unit controller 26.

Figure 4:
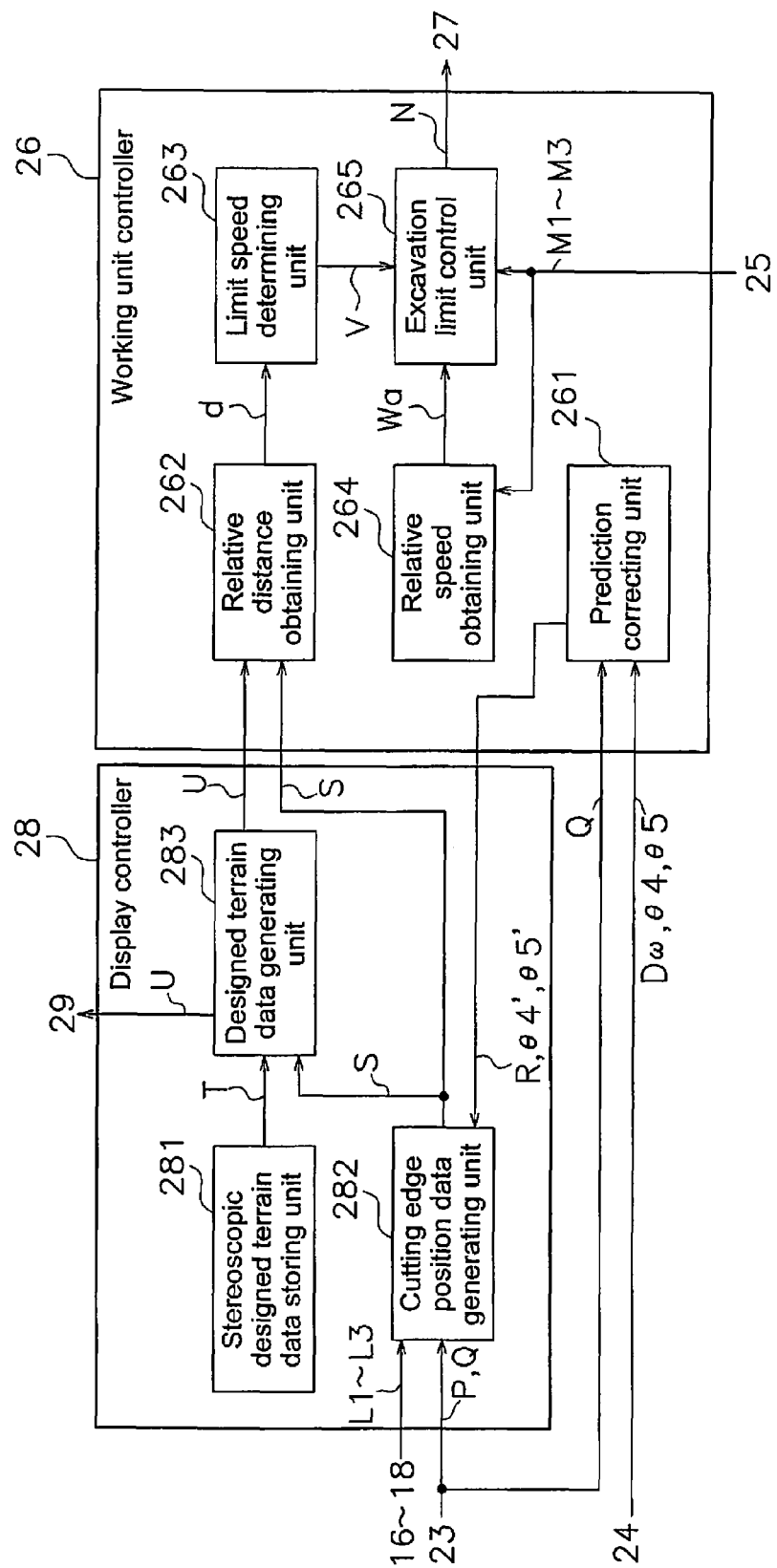
FIG. 4 is a block diagram of a configuration of a working unit controller and a display controller.

The display controller 28 obtains the revolving unit disposition data (the reference position data P and the revolving unit orientation data Q) from the global coordinate computing device 23, as shown in FIG. 3. The display controller 28 obtains the corrected revolving unit orientation data R from an after-mentioned prediction correcting part 261 in the working unit controller 26, as shown in FIG. 4. Moreover, the display controller 28 obtains the cylinder lengths L from the first to third stroke sensors 16 to 18. The display controller 28 generates "working unit position data" that indicates a position of the working unit based on the reference position data P, the revolving unit orientation data Q, the corrected revolving unit orientation data R, and the cylinder lengths L. In the present exemplary embodiment, the display controller 28 generates "cutting edge position data S" that indicates a three-dimensional position of the cutting edge 8a as the "working unit position data." The display controller 28 then uses the cutting edge position data S and after-mentioned stereoscopic designed terrain data T to generate the designed terrain data U that indicates a target shape of an excavation object. The display controller 28 causes the display unit 29 to display a designed terrain Ua based on the designed terrain data U.

Detailed Configuration of Working Unit Controller 26 and Display Controller 28

FIG. 4 is a block diagram illustrating a detailed configuration of the working unit controller 26 and the display controller 28.

The working unit controller 26 includes the prediction correcting part 261, a relative distance obtaining part 262, a limit speed determining part 263, a relative speed obtaining part 264, and an excavation limit control part 265. The display controller 28 has a stereoscopic designed terrain data storing part 281, a cutting edge position data generating part 282, and a designed terrain data generating part 283.

The prediction correcting part 261 obtains, from the global coordinate computing device 23, the revolving unit orientation data Q that indicates the orientation of the revolving unit 3 (that is, the working unit 2). The prediction correcting part 261 obtains, from the IMU 24, the revolve angle speed data Dω that indicates the revolve angle speed ω (see FIG. 1) of the revolving unit 3. The prediction correcting part 261 predictively corrects the revolving unit orientation data Q based on the revolve angle speed data Dω. Specifically, the prediction correcting part 261 calculates a predicted revolve angle ωt by multiplying the revolve angle speed ω by a delay time t. The delay time t is a predicted time period that spans the generation of the after-mentioned cutting edge position data S and the designed terrain data U. In the present exemplary embodiment, the delay time t is assumed to be approximately 0.4 s. The prediction correcting part 261 then generates the corrected revolving unit orientation data R that indicates a predicted orientation when the revolving unit 3 revolves from the orientation of the revolving unit orientation data Q by an amount equivalent to the predicted revolve angle ωt. The predicted orientation indicated by the corrected revolving unit orientation data R is an orientation of the revolving unit 3 (that is, the working unit 2) at the point in time that the designed terrain data U is generated.

Figure 5A:
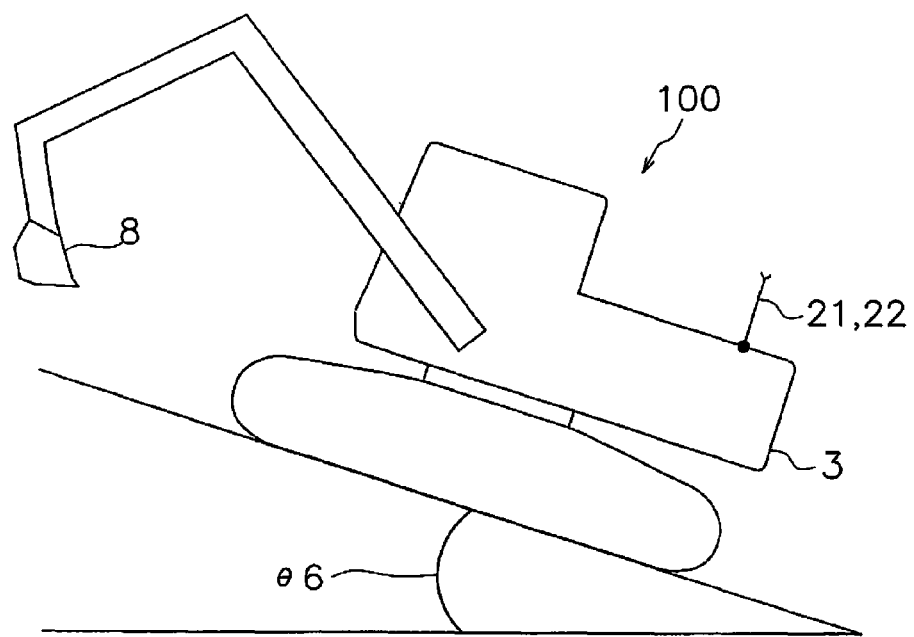
FIG. 5A is a side view for describing a tilt angle of a revolving unit in a first position on a hydraulic excavator that is positioned on a slope.
Figure 5B:
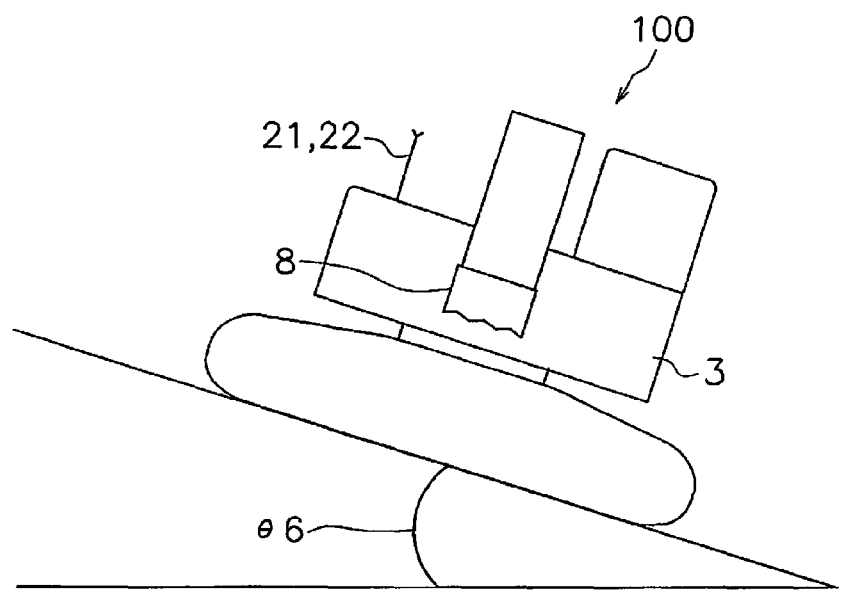
FIG. 5B is a side view for describing a tilt angle of a revolving unit in a second position on a hydraulic excavator that is positioned on a slope.

The prediction correcting part 261 obtains, from the IMU 24, the tilt angle θ4 relative to the left-right direction of the revolving unit 3, and the tilt angle θ5 relative to the front-back direction of the revolving unit 3. The prediction correcting part 261 calculates the predicted orientation of the revolving unit 3 based on the corrected revolving unit orientation data R. The prediction correcting part 261 calculates predicted tilt angles θ4' and θ5' of the predicted orientation. The following is an explanation of the predicted tilt angles θ4' and θ5' when assuming a case in which the revolving unit 3 is revolved to face sideways (a second position) as illustrated in FIG. 5B after the hydraulic excavator 100 has worked facing forward (a first position) on sloped land that is sloped at a tilt angle θ6 as illustrated in FIG. 5A. The tilt angle θ5 corresponding to the front-back direction of the revolving unit 3 gradually decreases from "θ6" to zero while the tilt angle θ4 corresponding to the sideways direction gradually increases from zero to "θ6" before and after the revolution motion. Therefore, the prediction correcting part 261 can use the revolve angle speed a to calculate the predicted tilt angles θ4' and θ5' after the delay time t has elapsed. The prediction correcting part 261 outputs the predicted tilt angles θ4' and θ5' to the cutting edge position data generating part 282. When the hydraulic excavator 100 is working on sloped land and the like, the tilt of the revolving unit 3 may be corrected even when the predicted tilt angles θ4' and θ5' of the revolving unit 3 change accompanying the revolution.

Figure 6:
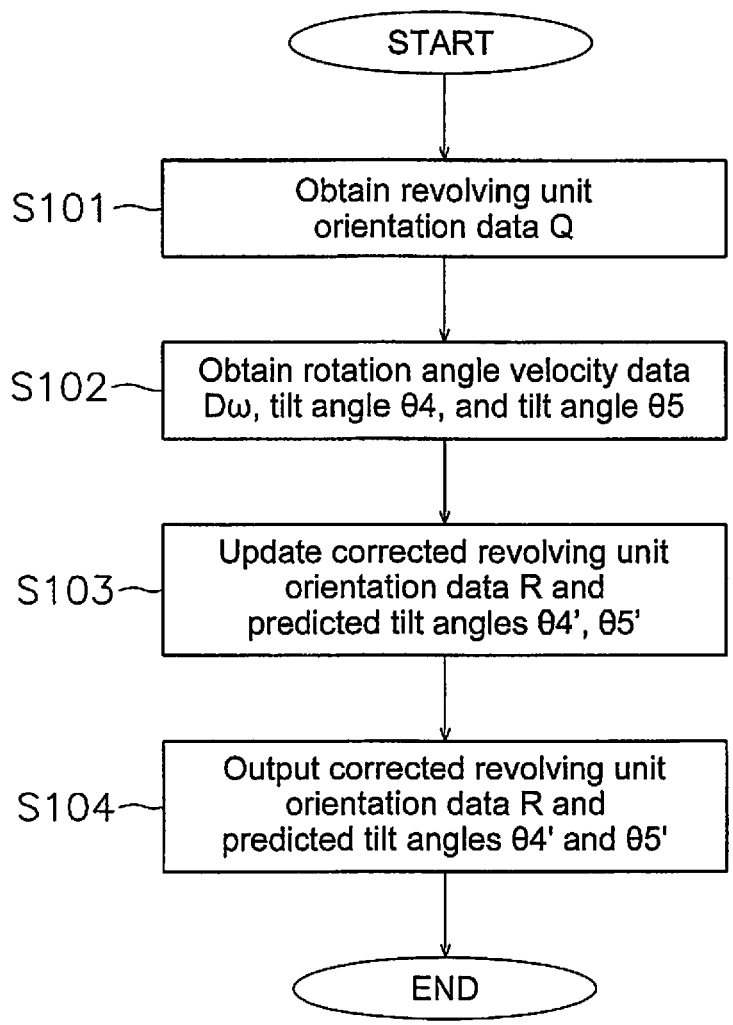
FIG. 6 is a flow chart of processing conducted by a prediction correcting part to update corrected revolving unit orientation data.
Figure 7:
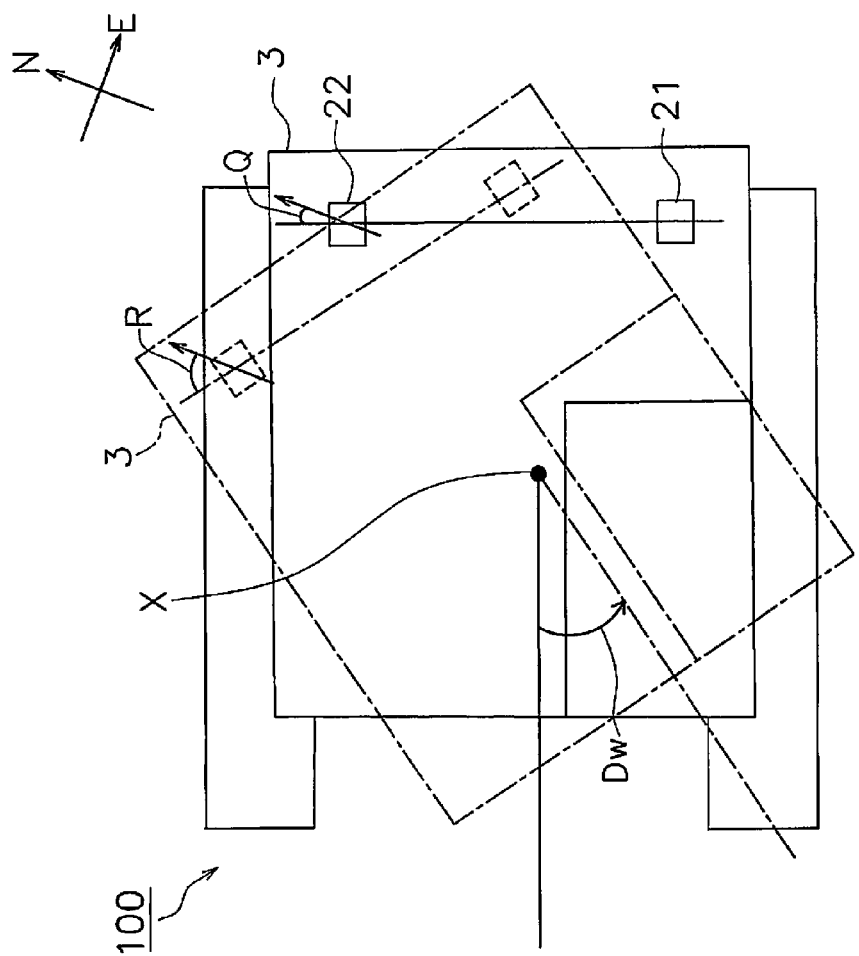
FIG. 7 describes processing of the prediction correcting part accompanying the motion of the revolving unit.

Updating of the corrected revolving unit orientation data R by the prediction correcting part 261 will be explained with reference to FIGS. 6 and 7. FIG. 6 is a flow chart for describing processing by the prediction correcting part 261 to update the corrected revolving unit orientation data R. FIG. 7 is a view for explaining processing of the prediction correcting part 261 executed accompanying motions of the revolving unit 3.

In step S101, the prediction correcting part 261 obtains, from the global coordinate computing device 23 at a frequency of, for example, 10 Hz (example of a second frequency), the revolving unit orientation data Q that indicates the orientation of the revolving unit 3.

In step S102, the prediction correcting part 261 obtains, from the IMU 24 at a frequency of, for example, 100 Hz (example of the first frequency), the revolve angle speed data Dω about the revolving axis AX, the tilt angle θ4 in the front-back direction of the revolving unit 3, and the tilt angle θ5 in the left-right direction of the revolving unit 3.

In step S103, the prediction correcting part 261 uses the latest revolve angle speed data Dω to update the corrected revolving unit orientation data R that indicates the orientation of the revolving unit 3 after revolving by ωt, the predicted tilt angle θ4' in the front-back direction of the revolving unit 3, and the predicted tilt angle θ5' in the left-right direction of the revolving unit 3, in response to obtaining the revolving unit orientation data Q.

In step S104, the prediction correcting part 261 outputs the updated corrected revolving unit orientation data R and the predicted tilt angles θ4' and θ5' to the cutting edge position data generating part 282.

The prediction correcting part 261 updates the corrected revolving unit orientation data R and the predicted tilt angles θ4' and θ5' by repeating the steps S101 to S104 upon receiving the revolving unit orientation data Q.

In this way, the prediction correcting part 261 can generate the corrected revolving unit orientation data R and the predicted tilt angles θ4' and θ5' at a higher frequency than the revolving unit orientation data Q by using the revolve angle speed data Dω and the tilt angles θ4 and θ5 obtained by the IMU 24 at a measuring frequency earlier than that of the revolving unit orientation data Q. The corrected revolving unit orientation data R and the predicted tilt angles θ4' and θ5' may be used to update the revolve angle speed data Dω and the tilt angles θ4 and θ5 that may include a thermal drift deviation, based on the revolving unit orientation data Q obtained from the global coordinate computing device 23. As a result, it is possible to transmit the related corrected revolving unit orientation data R and the predicted tilt angles θ4' and θ5' at the frequency for generating the designed terrain data U relative to the delay time t.

The stereoscopic designed terrain data storing part 281 stores the stereoscopic designed terrain data T that indicates a target shape (referred to below as "stereoscopic designed terrain") of a work area. The stereoscopic designed terrain data T includes coordinate data and angle data required for generating the designed terrain data U that indicates the target shape of an excavation object.

The cutting edge position data generating part 282 generates revolving center position data X that indicates a position of the revolving center of the hydraulic excavator 100 along the revolving axis AX based on the reference position data P and the revolving unit orientation data Q obtained from the global coordinate computing device 23. The cutting edge position data generating part 282 calculates the tilt angle θ1 of the boom 6 relative to the perpendicular direction of the vehicle main body 1, the tilt angle θ2 of the arm 7 relative to the boom 6, and the tilt angle θ3 of the bucket 8 relative to the arm 7, based on the cylinder lengths L obtained in real time from the first to third stroke sensors 16 to 18. The cutting edge position data generating part 282 generates the cutting edge position data S that indicates the current position of the cutting edge 8a based on the revolving center position data X, the corrected revolving unit orientation data R, the tilt angles θ1 to θ3 of the working unit, and the predicted tilt angles θ4' and θ5' of the revolving unit 3. In this way, by generating the cutting edge position data S in relation to the revolving center position data X, it is possible to generate the motions of the first and second GNSS antennas 21 and 22 accompanying the predicted revolution motions of the hydraulic excavator 100 indicated by the dashed lines in FIG. 7, from the reference position data P1 and P2 of the first and second GNSS antennas 21 and 22 of the hydraulic excavator 100 indicated by the solid lines in FIG. 7.

The cutting edge position data generating part 282 obtains, from the global coordinate computing device 23, the reference position data P and the revolving unit orientation data Q at a frequency of, for example, 10 Hz (example of the second frequency). Moreover, the cutting edge position data generating part 282 obtains, from the prediction correcting part 261, the corrected revolving unit orientation data R at a frequency of, for example, 10 Hz (example of the second frequency). Therefore, the cutting edge position data generating part 282 can update the cutting edge position data S at the frequency of, for example, 10 Hz (example of the second frequency). The cutting edge position data generating part 282 outputs the updated cutting edge position data S to the designed terrain data generating part 283.

Figure 8:
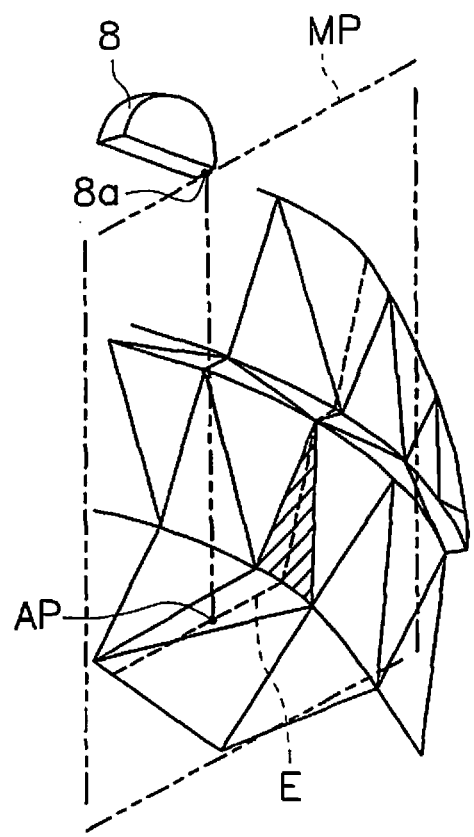
FIG. 8 describes a designed terrain determination method.

The designed terrain data generating part 283 obtains the stereoscopic designed terrain data T stored in the stereoscopic designed terrain data storing part 281, and obtains the cutting edge position data S from the cutting edge position data generating part 282. The designed terrain data generating part 283 obtains, based on the stereoscopic designed terrain data T and the cutting edge position data S, an intersection line E that intersects a motion plane MP of the working unit 2 prescribed by the front-back direction of the revolving unit 3 and the stereoscopic designed terrain as illustrated in FIG. 8. The designed terrain data generating part 283 sets a point directly below the cutting edge 8a on a candidate line in the designed terrain as a reference point AP in the designed terrain. The designed terrain data generating part 283 specifies one or a plurality of inflection points before and after the reference point AP in the designed terrain and the lines before and after the inflection points, as the designed terrain to be excavated. The designed terrain data generating part 283 then generates the designed terrain data U that indicates the target shape (FIG. 9) of an excavation object. The designed terrain data generating part 283 causes the display unit 29 to display the designed terrain Ua based on the designed terrain data U.

Here, the designed terrain data generating part 283 obtains, from the cutting edge position data generating part 282, the cutting edge position data S at the frequency of, for example, 10 Hz (example of the second frequency). Therefore, the designed terrain data generating part 283 can update the designed terrain data U at the frequency of, for example, 10 Hz (example of the second frequency). The designed terrain data generating part 283 outputs the updated designed terrain data U to the relative distance obtaining part 262.

In the present exemplary embodiment, it is assumed that the delay time t is required concurrent to the generation of the cutting edge position data S by the cutting edge position data generating part 282 and the generation of the designed terrain data U by the designed terrain data generating part 283.

Figure 9:
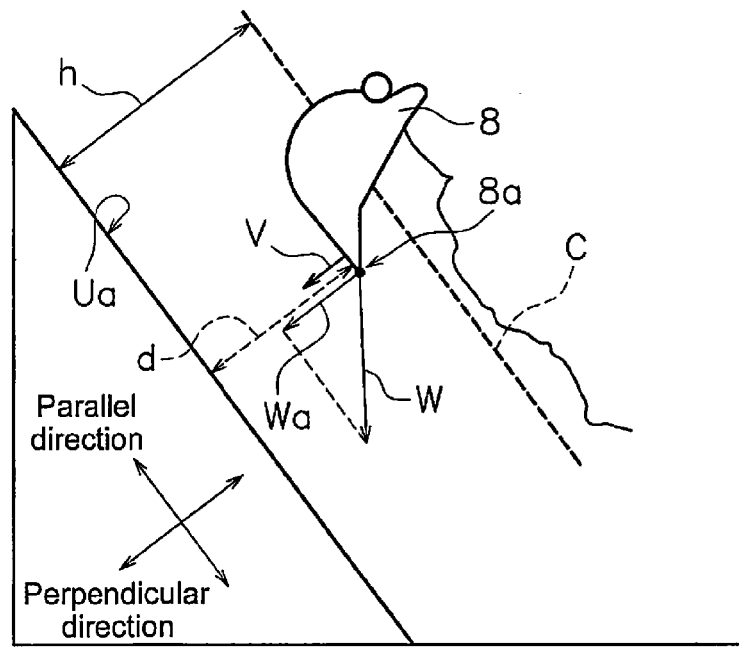
FIG. 9 describes excavation limit control.

The relative distance obtaining part 262 obtains the cutting edge position data S from the cutting edge position data generating part 282 and obtains the designed terrain data U from the designed terrain data generating part 283. The relative distance obtaining part 262 calculates a distance d between the cutting edge 8a and the designed terrain Ua in a direction perpendicular to the designed terrain Ua based on the cutting edge position data S and the designed terrain data U as illustrated in FIG. 9. In FIG. 9, the cutting edge 8a intrudes to the inside of an intervention line C of an excavation limit control and the distance d of the cutting edge 8a is smaller than a distance h from the intervention line C.

Figure 10:
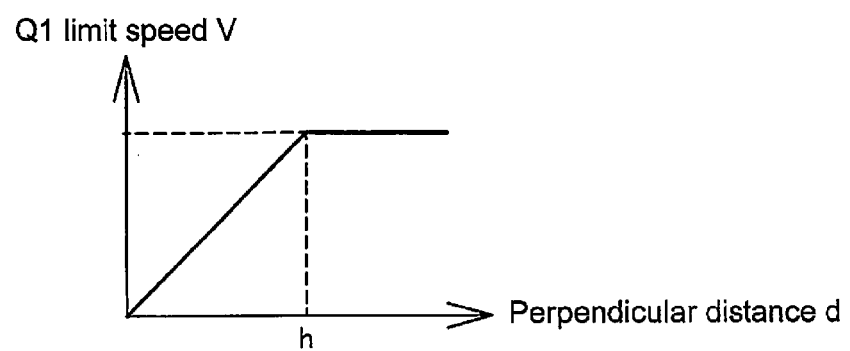
FIG. 10 is a graph illustrating the relationship between a limit speed and a perpendicular distance.

The limit speed determining part 263 obtains a limit speed V in the perpendicular direction to the designed terrain Ua that corresponds to the distance d. FIG. 10 is a graph illustrating the relationship between the limit speed V and the distance d. As illustrated in FIG. 10, the limit speed V is maximized when the distance d is equal to or greater than the distance h, and the limit speed V decreases as the distance d approaches the designed terrain Ua from the line distance h. When the distance d is zero, the limit speed V also becomes zero.

The relative speed obtaining part 264 calculates a speed W of the cutting edge 8a based on the operation signals M1 to M3 obtained from the operating device 25. The relative speed obtaining part 263 obtains a relative speed Wa (see FIG. 9) of the cutting edge 8a in the perpendicular direction to the designed terrain Ua, based on the speed W. The relative speed Wa is greater than the limit speed V in FIG. 9.

The excavation limit control part 265 controls the limit speed of the working unit 2 when the relative speed Wa of the cutting edge 8a exceeds the limit speed V. The control signal N for limiting the speed, for example, of the boom 7 is generated by adjusting the operation signals M1 to M3 of the operating device 25 so that the relative speed Wa of the cutting edge 8a is held to the limit speed V. The excavation limit control part 265 outputs the control signals N to the proportional control valve 27. Consequently, the excavation limit control on the cutting edge 8a is executed and the position of the cutting edge 8a is automatically adjusted relative to the designed terrain Ua.

Operation and Effects

The excavation control system 200 according to the present exemplary embodiment is provided with the global coordinate computing device 23 (example of the first data generating part), the prediction correcting part 261, the cutting edge position data generating part 282 (example of the second data generating part), and the designed terrain data generating part 283 (example of the third data generating part). The global coordinate computing device 23 generates the revolving unit orientation data Q (example of the revolving unit disposition data) that indicates an orientation of the revolving unit 3. The prediction correcting part 261 generates the corrected revolving unit orientation data R (example of the corrected revolving unit disposition data) by predictively correcting the revolving unit orientation data Q based on the delay time t and the revolve angle speed data Dω (example of the motion data) that indicates the revolve angle speed u of the revolving unit 3. The cutting edge position data generating part 282 generates the cutting edge position data S (example of the working unit position data) that indicates the position of the cutting edge 8a based on the reference position data P1, the revolving unit orientation data Q, and the corrected revolving unit orientation data R. The designed terrain data generating part 283 generates the designed terrain data U based on the cutting edge position data S and the stereoscopic designed terrain data T. A time period required for generating the cutting edge position data S and the stereoscopic designed terrain data T is included in the delay time t.

In this way, the prediction correcting part 261 uses the revolve angle speed ω of the revolving unit 3 to enable the prediction of the orientation of the revolving unit 3 at the point in time that the stereoscopic designed terrain data T is generated. As a result, the cutting edge position data generating part 282 can predict the position of the cutting edge 8a at the point in time that the delay time t elapses. Consequently, the designed terrain data generating part 283 can ascertain the designed terrain Ua corresponding to the position of the cutting edge 8a at the point in time that the stereoscopic designed terrain data T is generated.

The prediction correcting part 261 obtains the revolve angle speed data Dω at, for example, 100 Hz (example of the first frequency), and obtains the revolving unit orientation data Q at, for example, 10 Hz (example of the second frequency).

Therefore, the prediction correcting part 261 uses the revolving unit orientation data Q obtained cyclically to enable the generation of the corrected revolving unit orientation data R. Therefore, even when thermal drift occurs in the IMU 24 that generates the revolve angle speed data Dω, a corrected orientation can be calculated by using as a reference the revolving unit orientation data Q that is updated, for example, every 10 Hz. Therefore, the generation of the corrected revolving unit disposition data R that indicates a corrected orientation may be conducted continuously.

Other Exemplary Embodiments

Although an exemplary embodiment of the present invention has been described so far, the present invention is not limited to the above exemplary embodiments and various modifications may be made within the scope of the invention.

The present invention is not limited to the IMU 24 obtaining the tilt angles θ4 and θ5 and the revolve angle speed data Dɛ that indicates the revolve angle speed co of the revolving unit 3 as the "motion data" that indicates the motion of the revolving unit 3 as described in the above exemplary embodiment. The IMU 24 may obtain a deviation in a tilt angle that indicates the tilt of the revolving unit 3. The tilt angle of the revolving unit 3 is an amount of deviation of the tilt angles θ4 and θ5 (see FIGS. 2A and 2B) per unit of time. By using the deviation in the tilt angles in place of the revolve angle speed data Dω in this way, the designed terrain Ua at the point in time that the stereoscopic designed terrain data T is generated may be ascertained because the position of the cutting edge 8a at the point in time that the delay time t has elapsed may be obtained when the hydraulic excavator 100 sways.

The present invention is not limited to the prediction correcting part 261 obtaining the revolve angle speed data Dω generated by the IMU 24 as described in the above exemplary embodiment. The prediction correcting part 261 can obtain the revolve angle speed data Dω based on a revolve angle detected by a potentiometer disposed on the revolving unit 3 or based on the revolution operation signal M4 output by the operating device 25. Further, the prediction correcting part 261 can obtain the reference position data P1 and P2 of the first GNSS antenna 21 and the second GNSS antenna 22 from the global coordinate computing device 23, and can obtain the revolve angle speed data Dω based on the reference position data P1 and P2.

The present invention is not limited to the cutting edge position data generating part 282 calculating the position of the revolving center of the hydraulic excavator 100 based on the reference position data P1 and the revolving unit orientation data Q as described in the above exemplary embodiment. The cutting edge position data generating part 282 can use, in place of the revolving unit orientation data Q, data obtained from an orientation sensor, such as a magnetic sensor, which indicates the orientation of the revolving unit 3 at the point in time that the first GNSS antenna 21 receives the reference position data P1.

The present invention is not limited to the prediction correcting part 261 obtaining the revolving unit orientation data Q from the global coordinate computing device 23 at, for example, the frequency of 10 Hz (example of the second frequency), and the revolving unit orientation data Q can be obtained at least one time so long as the thermal drift of the IMU 24 does not require consideration. In this case, the prediction correcting part 261 may update the orientation of the revolving unit 3 at, for example, a frequency of 100 Hz (example of the first frequency) by occasionally adding the revolve angle speed data Dω based on the obtained revolving unit orientation data Q.

The present invention is not limited to the display controller 28 generating the cutting edge position data S as the working unit position data as described in the above exemplary embodiment. The display controller 28 can obtain position data that indicates an arbitrary position of the bucket 8 in place of the cutting edge position data S. The display controller 28 can obtain position data that indicates an arbitrary position of the cutting edge position data S near the designed terrain Ua. Moreover, the storage of the stereoscopic designed terrain data, the generation of the cutting edge position data, and the generation of the designed terrain data conducted by the display controller 28 can be conducted by the working unit controller 26.

The present invention is not limited to the linear relationship as illustrated in FIG. 10 between the limit speed V and the perpendicular distance d as described in the above exemplary embodiment. The limit speed V and the perpendicular distance d may have a non-linear relationship and may not pass through the point of origin in the graph in FIG. 10.

The excavation control system of the hydraulic excavator according to the exemplary embodiments of the present invention is applicable to the field of construction machines to obtain a designed terrain to be excavated.

What is claimed is:

1. An excavation control system for a hydraulic excavator having a drive unit, a revolving unit being revolvable about a revolving axis on the drive unit, and a working unit attached to the revolving unit, the excavation control system comprising:
   a first data generating part configured to generate revolving unit disposition data, the revolving unit disposition data indicating a disposition of the revolving unit;
   a prediction correcting part configured to generate corrected revolving unit disposition data by predictively correcting the revolving unit disposition data based on motion data, the motion data indicating a motion of the revolving unit;
   a second data generating part configured to generate working unit position data based on the revolving unit disposition data and the corrected revolving unit disposition data, the working unit position data indicating a position of the working unit;
   a third data generating part configured to generate designed terrain data based on the working unit position data, the designed terrain data indicating a target shape of an excavation object;
   an excavation limit control part configured to limit a speed of the working unit with respect to the designed terrain in accordance with a distance from the designed terrain, the distance obtained based on the working unit position data and the designed terrain data;
   the prediction correcting part configured to generate the corrected revolving unit disposition data by predictively correcting the revolving unit disposition data based on the motion data and a delay time, the delay time including a time period required for the second data generating part to generate the working unit position data and a time period required for the third data generating part to generate the designed terrain data.

2. The excavation control system according to claim 1, wherein
   the prediction correcting part is configured to obtain revolve angle speed data at a first frequency, the revolve angle speed data indicating a revolve angle speed of the revolving unit about the revolving axis, and
   the prediction correcting part is configured to predictively correct the revolving unit disposition data based on a multiplied value of the delay time and the revolve angle speed indicated by the revolve angle speed data.

3. The excavation control system according to claim 2, wherein
   the first data generating part is configured to obtain a plurality of reference position data at a second frequency, the plurality of reference position data indicating positions of a plurality of reference parts disposed on the revolving unit,
   the first data generating part is configured to generate revolving unit orientation data based on the plurality of reference position data, the revolving unit orientation data indicating an orientation of the revolving unit, and
   the prediction correcting part is configured to obtain the revolving unit orientation data at least once.

4. The excavation control system according to claim 3, wherein
the first frequency is shorter than the second frequency, and
the prediction correcting part is configured to obtain the revolving unit orientation data at the second frequency.

5. The excavation control system according to claim 1, wherein
the second data generating part is configured to generate revolving center position data based on the revolving unit disposition data, the revolving center position data indicating a position of a revolving center of the hydraulic excavator, the revolving center passing through the revolving axis, and
the second data generating part is configured to generate the working unit position data based on the revolving center position data and the corrected revolving unit disposition data.

6. The excavation control system according to claim 1, wherein
the prediction correcting part is configured to calculate a predicted tilt angle by predictively correcting a tilt angle, the tilt angle indicating tilt angle of the revolving unit in a front-back direction and in a left-right direction, and
the second data generating part is configured to generate the working unit position data based on the predicted tilt angle, the revolving unit disposition data, and the corrected revolving unit disposition data.

7. The excavation control system according to claim 4, wherein
the second data generating part is configured to generate revolving center position data based on the revolving unit disposition data, the revolving center position data indicating a position of a revolving center of the hydraulic excavator, the revolving center passing through the revolving axis, and
the second data generating part is configured to generate the working unit position data based on the revolving center position data and the corrected revolving unit disposition data.

8. The excavation control system according to claim 4, wherein
the prediction correcting part is configured to calculate a predicted tilt angle by predictively correcting a tilt angle, the tilt angle indicating tilt angle of the revolving unit in a front-back direction and in a left-right direction, and
the second data generating part is configured to generate the working unit position data based on the predicted tilt angle, the revolving unit disposition data, and the corrected revolving unit disposition data.

9. The excavation control system according to claim 7, wherein
the prediction correcting part is configured to calculate a predicted tilt angle by predictively correcting a tilt angle, the tilt angle indicating tilt angle of the revolving unit in a front-back direction and in a left-right direction, and
the second data generating part is configured to generate the working unit position data based on the predicted tilt angle, the revolving unit disposition data, and the corrected revolving unit disposition data.

* * * * *